United States Patent
Nakazawa et al.

(10) Patent No.: US 8,093,338 B2
(45) Date of Patent: Jan. 10, 2012

(54) **BIOPOLYMER ORIGINATING IN *EUCOMMIA ULMOIDES***

(75) Inventors: Yoshihisa Nakazawa, Osaka (JP); Yoko Nakadozono, Osaka (JP); Akio Kobayashi, Suita (JP); Shuntaro Maeta, Suita (JP); Tuyoshi Takeda, Suita (JP); Takeshi Bamba, Suita (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

(21) Appl. No.: 12/922,504

(22) PCT Filed: Mar. 3, 2009

(86) PCT No.: PCT/JP2009/053951
§ 371 (c)(1),
(2), (4) Date: Sep. 14, 2010

(87) PCT Pub. No.: WO2009/113425
PCT Pub. Date: Sep. 17, 2009

(65) Prior Publication Data
US 2011/0003958 A1    Jan. 6, 2011

(30) Foreign Application Priority Data
Mar. 14, 2008 (JP) .................................. 2008-065800

(51) Int. Cl.
*C08F 8/50* (2006.01)
(52) U.S. Cl. ..................................... 525/326.1; 526/336
(58) Field of Classification Search ................ 525/326.1; 526/335
See application file for complete search history.

(56) References Cited

FOREIGN PATENT DOCUMENTS

| CN | 86100216 | * | 9/1986 |
|---|---|---|---|
| CN | 86100216 A | | 9/1986 |
| CN | 1356153 A | | 7/2002 |
| CN | 1948410 A | | 4/2007 |
| CN | 101157827 A | | 4/2008 |
| JP | 2004189953 A | | 7/2004 |

OTHER PUBLICATIONS

Tangpakdee et al. "Structure and biosynthesis of trans-polyisoprene from *Eucommia ulmoides*" 45(1), 75-80 (1997).*

Zhang, Xuejun et al., "Effect of Alkali and Enzymatic Pretreatments of *Eucommia ulmoides* Leaves and Barks on the Extraction of *Gutta percha*", Journal of Agricultural and Food Chemistry, Aug. 30, 2008, pp. 8936-8943, vol. 56, No. 19, American Chemical Society.

Takeno, Shinya et al., "Quantification of trans-1,4-Polyisoprene in *Eucommia ulmoides* by Fourier Transform Infrared Spectroscopy and Pyrolysis-Gas Chromatography/Mass Spectrometry", 2008, pp. 355-359, vol. 105, No. 4, The Society for Biotechnology, Japan.

* cited by examiner

*Primary Examiner* — Ling Choi
(74) *Attorney, Agent, or Firm* — The Webb Law Firm

(57) ABSTRACT

Provided is an eucommia-derived biopolymer, which is obtained by biologically decaying an eucommia to obtain an eucommia decomposition product, and washing the eucommia decomposition product. The biopolymer is obtained by such a convenient method, and contains mainly a trans-isoprenoid and has a relatively high molecular weight. Therefore, the biopolymer is solid and elastomeric, and is useful as an industrial material.

7 Claims, 5 Drawing Sheets

BIOPOLYMER ORIGINATING IN *EUCOMMIA ULMOIDES*

TECHNICAL FIELD

The present invention relates to a novel biopolymer derived from eucommia.

BACKGROUND ART

In recent years, there is a social demand for the use of carbon-neutral resources. It is the last biopolymers remaining on the earth that polymers accumulated by metabolization in natural sources such as plants.

It is known as plant-derived biopolymers that natural rubber and balata, milky gum extracted from gutta-percha tree, native to tropical areas. Natural rubber is cis-isoprene rubber made from sap collected from the rubber tree. Balata is a trans-polyisoprenoid and used for the production of, for example, golf balls and dental care materials. Also, eucommia rubber, which is an eucommia-derived biopolymer, is a trans-polyisoprenoid. Attempts have been made to use a vulcanized eucommia rubber for motorcycle tires and tubes, but industrial use thereof has not yet been attained.

Extraction from plant tissue with organic solvents or the like for elution has been conventionally and effectively used for extraction of an eucommia-derived biopolymer. For example, Patent Document 1 discloses a method for producing an eucommia rubber characterized by subjecting a starting eucommia to ethanol extraction followed by removing the extracting solvent, subjecting the solid residue to toluene extraction, and then concentrating toluene or evaporating it to dryness so as to yield crude eucommia rubber; and further allowing the crude eucommia rubber to precipitate in a mixed solvent of toluene and methanol, dissolving the resulting precipitate in hot n-hexane, and then reprecipitating it by cooling. However, there are various disadvantages in this method, such as costs due to the use of organic solvents and thermal energy, an environmental burden due to the use of organic solvents, a continuous operation for a long period of time, and difficulties in scale-up. Furthermore, the resulting eucommia rubber merely contains rubber soluble in the extracting solvents, and has a decreased molecular weight.

[Patent Document 1] Japanese Laid-Open Patent Publication No. 2004-189953

It is an object of the present invention to provide a novel biopolymer derived from natural sources, and a method for producing the same.

SUMMARY OF THE INVENTION

Conducting extensive researches to obtain a novel biopolymer derived from natural sources, the inventors have found that such a biopolymer can be conveniently and safely obtained by biologically decaying an eucommia to obtain an eucommia decomposition product, and washing the eucommia decomposition product, and the resulting biopolymer, which is considered to have the structure having a side chain or branch, and/or a crosslink between the polymer molecules, is superior in physical strengths, such as tensile strength, thermoplasticity, and abrasion resistance, compared to eucommia rubbers obtained by any conventional solvent extraction method, and thus have accomplished the present invention.

An eucommia-derived biopolymer of the present invention is obtained by biologically decaying an eucommia to obtain an eucommia decomposition product, and washing the eucommia decomposition product.

In one embodiment, the washing is high pressure water washing.

In one embodiment, the eucommia is at least one portion of seed and pericarp of eucommia.

In one embodiment, the biopolymer has a weight average molecular weight of $1 \times 10^3$ to $1 \times 10^6$.

A method for producing an eucommia-derived biopolymer of the present invention comprises biologically decaying an eucommia to obtain an eucommia decomposition product, and washing the eucommia decomposition product.

A processed product of an eucommia-derived biopolymer of the present invention is obtained by processing the above-described eucommia-derived biopolymer.

EFFECTS OF THE INVENTION

According to the present invention, an eucommia-derived biopolymer can be obtained merely by biologically decaying an eucommia to obtain an eucommia decomposition product, and washing the eucommia decomposition product. Compared to any conventional extraction method, the method of the present invention is safe and convenient, and addresses environmental concerns since it does not use heating or organic solvents. Moreover, the actual work time is reduced. Since the method does not require any large-scale facility, it allows for working, for example, in mountain areas where material eucommia trees grow. Furthermore, the resultant biopolymer contains mainly a trans-isoprenoid and has a relatively high molecular weight, and thus is solid and elastomer, and is industrially applicable.

DETAILED DESCRIPTION OF THE INVENTION

Figure 1:
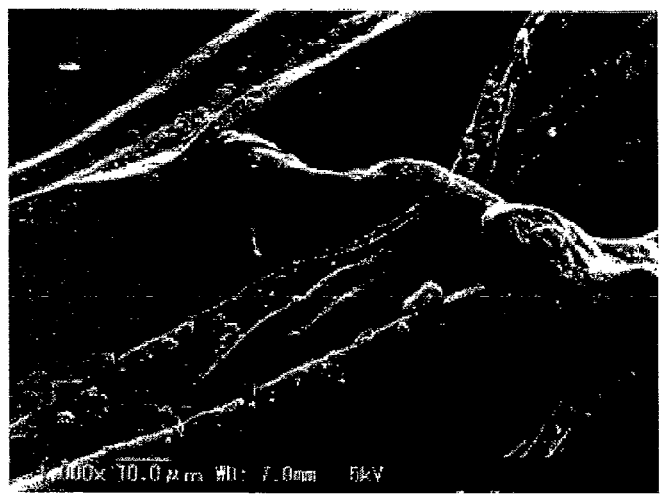
FIG. 1 is a scanning electron micrograph (×1000) showing the state of crude eucommia rubber.

The eucommia-derived biopolymer of the present invention is obtained by biologically decaying an eucommia to obtain an eucommia decomposition product and washing the eucommia decomposition product. The eucommia-derived biopolymer of the present invention contains as a main component, a trans-polyisoprenoid which has a higher molecular weight than eucommia rubber obtained by any conventional solvent extraction method.

Eucommia (*Eucommia ulmoides* O.) for use in the present invention is a woody, tall tree. Eucommia contains a trans-polyisoprenoid in its entire plant body, and any portion of which can be used. In the regard of large amounts of trans-polyisoprenoid, what is preferably used is seed and pericarp (both containing trans-polyisoprenoid in an amount of about 20 wt % or more), bark (about 12 wt % or more), and leaf (about 3 wt %) of eucommia, more preferably seed and pericarp. Eucommia can be used with or without processing such as drying. In particular, it is possible to use oil expression residues for seed and pericarp of eucommia, which is preferable in the regard of efficient use of waste.

In the method of the present invention, eucommia is first decayed biologically, that is, eucommia is contacted with an organism capable of collapsing the tissue structure of eucommia. In the present invention, the decay refers to that eucommia is eroded by an organism such as white rot fungus while retaining its original shape but the tissue structure thereof can be easily collapsed when touched by hand. The decaying step allows the tissue structure of eucommia to collapse, making it easy to separate a eucommia-derived biopolymer from the tissue by physical actions including the subsequent washing step.

There is no particular limitation on the organism capable of collapsing the tissue structure of eucommia insofar as it can erode or decompose tissues, cells, or intracellular components (such as metabolites) of eucommia. Examples include wood-rotting fungi such as white rot fungi, brown rot fungi, and soft rot fungi (including true fungi, slime fungi, and the like); microorganisms (such as *Bacillus subtilis* and actinomycetes); and insects (such as termites and ticks). Such organisms can be used alone or in combination of two or more. For example, humus (leaf mold) can be used as a complex bacterial flora of true fungi, slime fungi, actinomyces, and the like. For example, humus can occur between topsoil and floor vegetation in forest of broadleaf trees including camphor tree, blue Japanese oak, castanopsis, *Machilus thunbergii*, and the like. In the present invention, humus is preferably used in that it can effectively erode the tissue of eucommia and is easily available.

The ratio of eucommia to the organism capable of collapsing the tissue structure of eucommia can be appropriately determined, in consideration of factors such as the decaying time. For example, when humus is used, 30000 parts by weight of eucommia (pericarp) can be contacted with 1 part by weight of humus. Examples of contacting include: placing eucommia in a net bag or the like and burying it in humus; placing humus in a net bag or the like and putting it in oil expression residues (of seed and pericarp) of eucommia; and supplying to eucommia a rinse water obtained after washing humus with water.

There is also no particular limitation on the time or temperature of contacting eucommia with the organism capable of collapsing the tissue structure of eucommia. The contact temperature can be within the temperature range in which the organism is viable. The contact time is appropriately determined, depending on factors such as the amounts of organism and eucommia, and the contact temperature. For example, when the eucommia pericarp is decayed at the floor using the humus in the broadleaf forest, the decay period required is 2 weeks to 3 months and preferably 1 to 2 months.

The resulting eucommia decomposition product is then washed. By washing, adjunct substances, such as tissue mass, dried cells, primary and secondary metabolites, in the eucommia decomposition product can be removed from the eucommia-derived polymer. For example, what is used for washing is water, aqueous solutions of surfactant (including Tween (registered trademark)), and polymer-insoluble polar solvents (such as ethanol, methanol, and butanol). In the regards of the cost and environment, water is preferable.

There is no particular limitation on the method of washing insofar as adjunct substances can be removed. For washing, for example, water washing and kneading are repeated appropriately (such as 2 to 10 times and preferably 2 to 6 times). In the regard of efficient removal of adjunct substances, it is preferred that washing under high pressure, i.e., at any pressure exceeding ordinary pressure ($10^5$ Pa). For example, washing is performed at a discharge rate of 300 to 400 L/h and preferably 370 L/h and at a discharge pressure of 0.1 to 15 MPa and preferably 2 to 8 MPa using a high-pressure washer. A higher purity of eucommia-derived polymer can be obtained in a shorter period of time by high pressure water washing, than repeats of washing and kneading.

Washing can be followed by alkali treatment. By alkali treatment, lignin, phenol, and the like can be easily removed, allowing for further purification. Specifically, alkali treatment is performed by further washing the washed eucommia decomposition product with 0.1 to 4 N of aqueous sodium hydroxide, or the like.

Through decaying and washing as mentioned above, an eucommia-derived biopolymer is obtained. The yield of biopolymer from dried matters of eucommia is usually about 20% or greater and preferably about 22 to 35%.

The eucommia-derived biopolymer of the present invention contains a trans-isoprenoid as a main component and can contain cellulose as necessary. The content of trans-isoprenoid in the eucommia-derived biopolymer of the present invention is preferably 50 wt % or more, more preferably 60 wt % or more, still more preferably 70 wt % or more, yet more preferably 90 wt % or more, and most preferably 95 wt % or more, and can be 100 wt %.

When the eucommia-derived biopolymer of the present invention contains cellulose, the biopolymer of the present invention is a mixed rubber of trans-isoprenoid and cellulose, in which the weight ratio of trans-isoprenoid to cellulose is usually 5:5 (preferably 6:4) to 8:2 (preferably 7:3). For example, such a mixed rubber is obtained by using washing of water washing and kneading followed by alkali treatment.

The eucommia-derived biopolymer of the present invention has a weight average molecular weight of $1 \times 10^3$ to $1 \times 10^6$, preferably $1 \times 10^4$ to $1 \times 10^6$, and more preferably $1 \times 10^5$ to $1 \times 10^6$. Such a biopolymer of high molecular weight is solid and elastomer, and is useful for industrial materials. In particular, a biopolymer obtained by high pressure washing is fibrous, and has fused points of fibers.

The eucommia-derived biopolymer of the present invention is a hard rubber, has a high surface hardness, and is excellent in various properties such as thermoplasticity, electrical insulation, acid resistance, and alkali resistance. The eucommia-derived biopolymer of the present invention can be applied to a variety of fields, such as auto industry, substrates for home electronics, fuel cells, insulating thin films, antiseismic materials, sound-proof materials, and biofuels.

The eucommia-derived biopolymer of the present invention can be further processed to obtain a processed product of eucommia-derived biopolymer. Such processing can modify the eucommia-derived biopolymer to obtain, for example, a polymer with smooth and soft feel. Examples of processing include solvent dissolution processing and heat dissolution processing. For example, solvent dissolution processing is performed by dissolving the eucommia-derived biopolymer in a solvent such as toluene, chloroform, or formaldehyde, introducing the solution into a mold, and drying it. For example, heat dissolution processing is performed by heating the eucommia-derived biopolymer at 75 to 130° C. for 5 minutes or longer and shaping it.

EXAMPLES

Example 1

One kilogram of a eucommia-derived oil expression residues (containing seed and pericarp of eucommia) were placed in a net bag (a nylon bag with a mesh having a length of 2 mm square), buried in humus layer (depth of about 5 cm from the ground surface) in broadleaf forest (including camphor tree, castanopsis, *Machilus thunbergii*, and the like), and left for two months. The eucommia in the net bag was examined for collapsing easily when touched by hand to confirm the decay, and then washed with water, thereby obtaining a crude eucommia rubber.

Furthermore, the crude eucommia rubber was washed with water at a discharge rate of 370 L/h and at a discharge pressure of 0.2 to 0.9 MPa, thereby obtaining a purified eucommia rubber (referred to as purified eucommia rubber 1). The final amount and the yield of purified eucommia rubber 1 were 0.3 kg and about 30%, respectively. The work time required to obtain purified eucommia rubber from crude eucommia rubber was about 1 hour.

Figure 3:
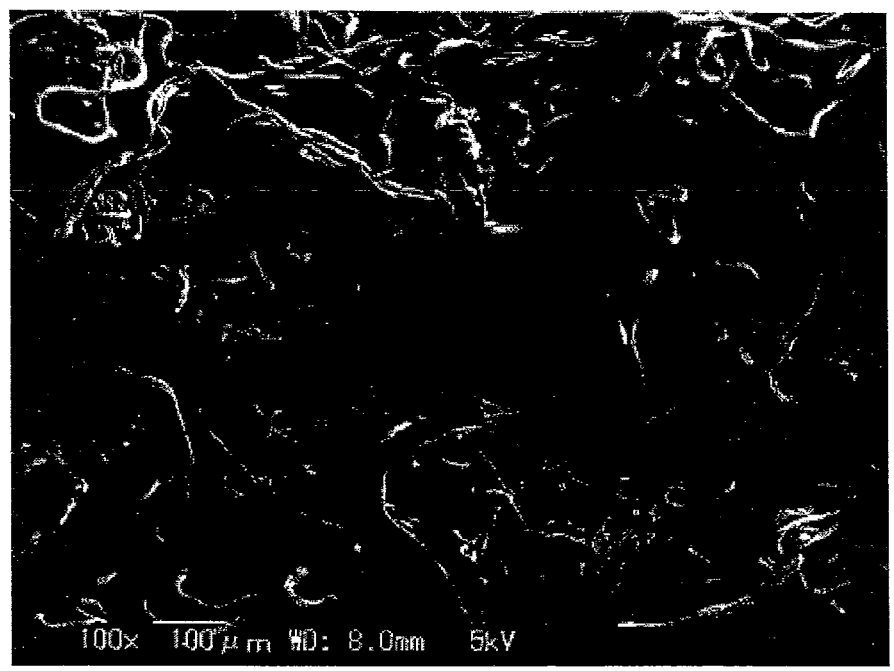
FIG. 3 is a scanning electron micrograph (×100) showing the state of purified eucommia rubber 1.
Figure 4:
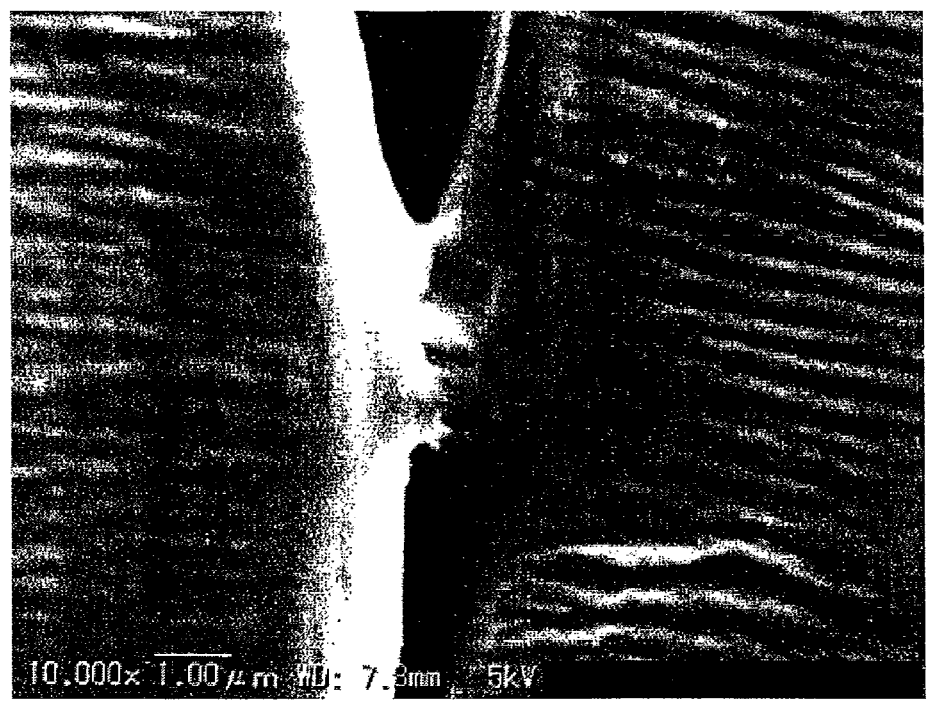
FIG. 4 is a scanning electron micrograph (×10000) showing the state of purified eucommia rubber 1.

Then, the crude eucommia rubber and purified eucommia rubber 1 were observed by scanning electron microscopy (SEM). FIG. 1 shows a scanning electron micrograph of the crude eucommia rubber, and FIGS. 2 to 4 show scanning electron micrographs of purified eucommia rubber 1, after high pressure water washing.

Figure 2:
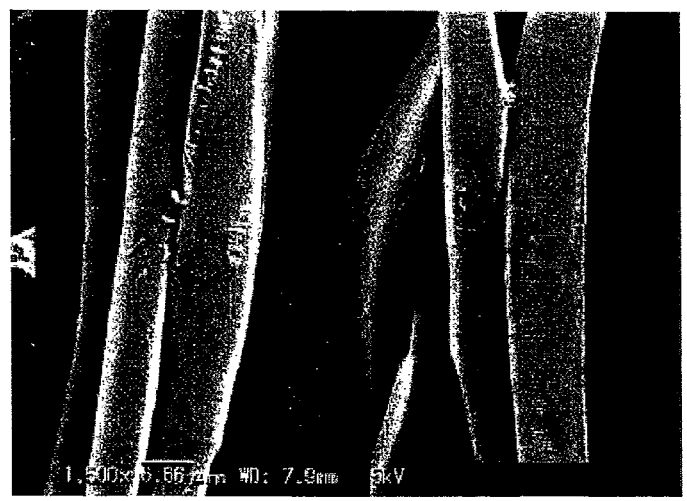
FIG. 2 is a scanning electron micrograph (×1500) showing the state of purified eucommia rubber 1.

The crude eucommia rubber, before high pressure water washing, as shown in FIG. 1 contained more adjunct substances than purified eucommia product 1 as shown in FIG. 2, which made it clear that adjunct substances can be removed easily by high-pressure water washing. As can be understood from the scanning electron micrographs shown in FIGS. 2 and 3, purified eucommia rubber 1 is fibrous with fibers having a length of about 1 μm to 1 mm and a width of 0.5 to 40 μm. Moreover, the fusion of fibers was observed in purified eucommia rubber 1 (see FIG. 4). It is possible that the fusion of fibers enhances the strength of the eucommia rubber.

Furthermore, purified eucommia rubber 1 was determined for its average molecular weight by size exclusion chromatography (SEC), and found to have a number average molecular weight (Mn) of $6.6 \times 10^4$, a weight average molecular weight (Mw) of $1.25 \times 10^5$, and a polydispersity index (Mw/Mn) of 1.9.

Figure 5:
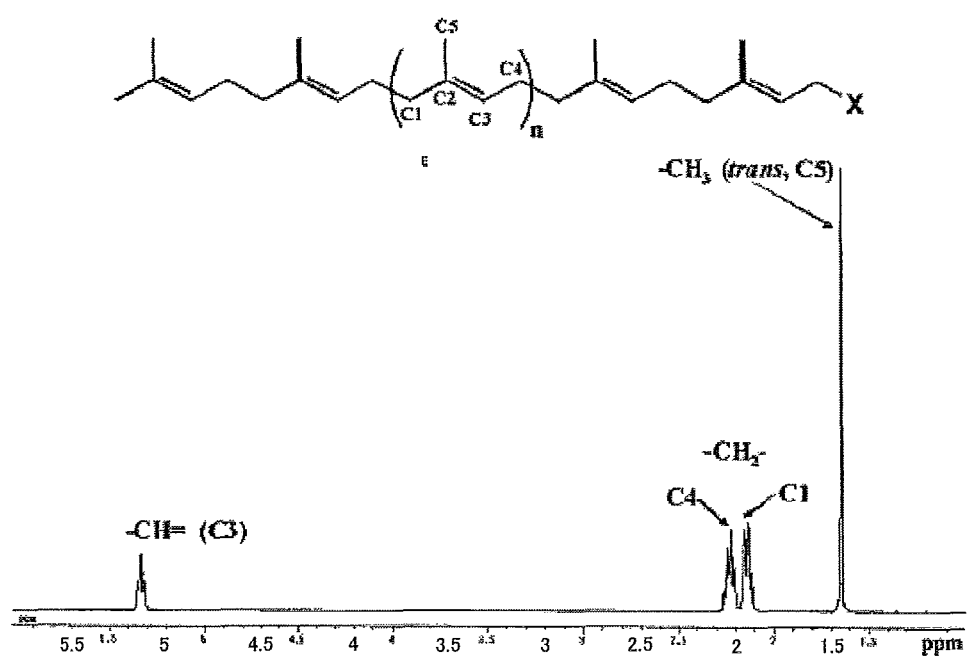
FIG. 5 shows a nuclear magnetic resonance spectrum and the structural formula of purified eucommia rubber 1.

By $^1$H-NMR analysis, it could be confirmed that purified eucommia rubber 1 is a high purity (about 95% or more) of trans-isoprenoid, with few contaminants, as shown in FIG. 5.

Example 2

The crude eucommia rubber prepared in Example 1 was subject to 6 repeats of water washing and kneading to remove adjunct substances, and treated with 1 N aqueous sodium hydroxide for hydrolysis to remove phenol. The yield of the resultant purified eucommia rubber (referred to as purified eucommia rubber 2) was about 29%.

Then, purified eucommia rubber 2 was introduced into a separating funnel and subject to partitions using chloroform. By measuring the eluted matter and residue by chloroform for their weight, purified eucommia rubber 2 was determined for the contents of eucommia rubber and cellulose, and found to have about 80 wt % of Eucommia rubber (trans-isoprenoid) and about 20 wt % of cellulose.

Example 3

Figure 6:
FIG. 6 is a scanning electron micrograph (×150) showing the surface structure of a sheet obtained from purified eucommia rubber 1.

A sheet (referred to as sheet 1) was obtained by dissolving 100 g of purified eucommia rubber 1 obtained in Example 1 in 300 mL of toluene, and forming the sheet from the solution. The surface of sheet 1 was very smooth and had a soft feel. Moreover, sheet 1 was observed by scanning electron microscopy (SEM). FIG. 6 shows a scanning electron micrograph of sheet 1. As apparent from FIG. 6, the surface of sheet 1 had a polygonal ramentum-like structure.

On the other hand, sheet 2 was obtained in the same manner as above, except that chloroform was used instead of toluene. As with sheet 1, the surface of sheet 2 had a polygonal ramentum-like structure, and was very smooth and had a soft feel.

Example 4

Figure 7:
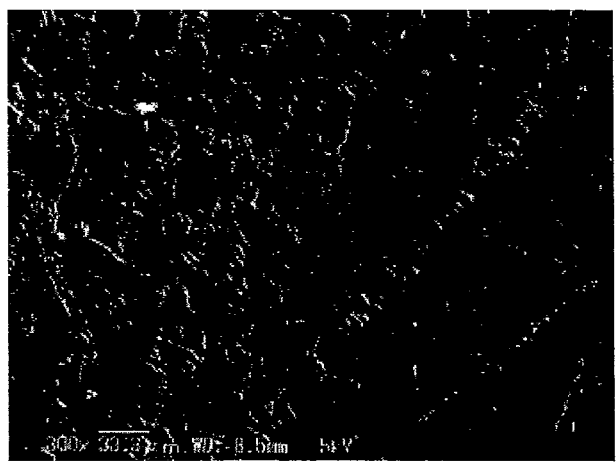
FIG. 7 is a scanning electron micrograph (×300) showing the surface structure of a sheet obtained from purified eucommia rubber 1.

A sheet (referred to as sheet 3) was obtained by heating purified eucommia rubber 1 obtained in Example 1 at 75 to 130° C. for about 5 minute so as to melt it, and subjecting it to roll-milling so as to form the sheet. The surface of sheet 3 was very smooth and had a soft feel. Moreover, sheet 3 was observed by scanning electron microscopy (SEM). FIG. 7 shows a scanning electron micrograph of sheet 3. As apparent from FIG. 7, the surface of sheet 3 had a polygonal ramentum-like structure.

As seen from the results of Examples 3 and 4, the eucommia-derived polymer of the present invention can be subject to processing such as organic solvent treatment or heat treatment to give variations in shape. Such a polymer is industrially applicable to a variety of fields.

INDUSTRIAL APPLICABILITY

According to the present invention, an eucommia-derived biopolymer can be obtained merely by biologically decaying an eucommia to obtain an eucommia decomposition product, and washing the eucommia decomposition product. Compared to any conventional extraction method, the method of the present invention is safe and convenient, and addresses environmental concerns since it does not use heating or organic solvents. Moreover, the actual work time is reduced. Since the method does not require any large-scale facility; it allows for working, for example, in mountain areas where material eucommia trees grow. Furthermore, the resultant biopolymer contains mainly a trans-isoprenoid and has a relatively high molecular weight, and thus is solid and elastomer, and is industrially applicable. Moreover, the biopolymer can be stored as a material and supplied when necessary. The biopolymer can be applied to a variety of fields such as auto industry, substrate of home electronics, fuel cell, insulating thin film, antiseismic material, sound-proof material, and biofuel, as a carbon neutral polymer. The biopolymer can be processed to obtain a polymer with smooth and soft feel.

The invention claimed is:

1. A method for producing an eucommia-derived biopolymer comprising:
   biologically decaying an eucommia to obtain an eucommia decomposition product wherein the eucommia is decayed so that the eucommia can be collapsed by hand, and
   washing the eucommia decomposition product.

2. The method according to claim 1, wherein the washing is high pressure water washing.

3. The method according to claim 1, wherein the eucommia is at least one portion of seed and pericarp of eucommia.

4. The method according to claim 1, wherein the biopolymer has a weight average molecular weight of $1 \times 10^3$ to $1 \times 10^6$.

5. The method according to claim 2, wherein the eucommia is at least one portion of seed and pericarp of eucommia.

6. The method according to claim 2, wherein the biopolymer has a weight average molecular weight of $1\times10^3$ to $1\times10^6$.

7. The method according to claim 3, wherein the biopolymer has a weight average molecular weight of $1\times10^3$ to $1\times10^6$.

* * * * *